No. 746,422. PATENTED DEC. 8, 1903.
A. R. WEBSTER.
ADJUSTABLE SOLDERING BLOCK.
APPLICATION FILED APR. 30, 1903.
NO MODEL.
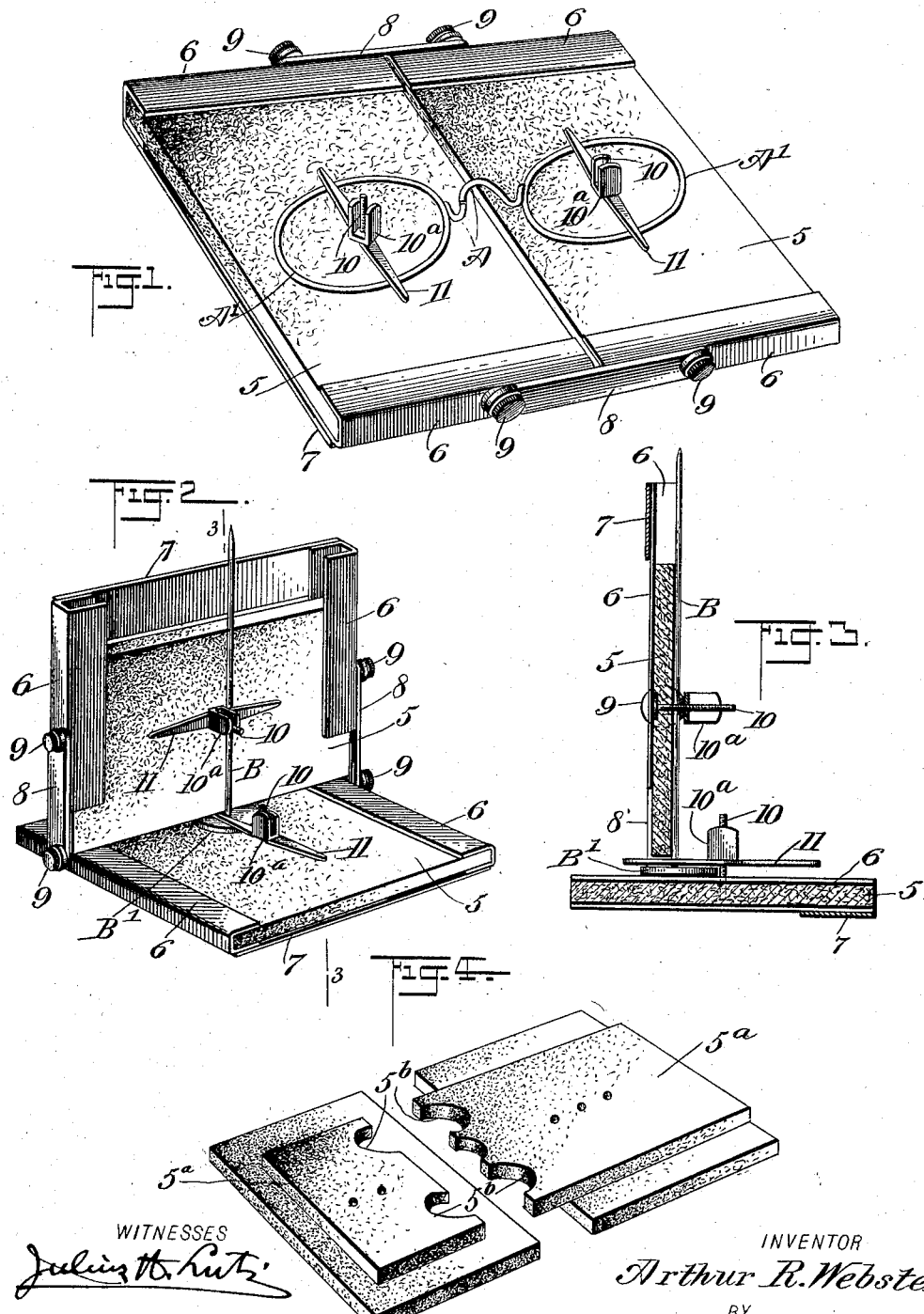
WITNESSES
INVENTOR
Arthur R. Webster
BY
ATTORNEYS.

No. 746,422. Patented December 8, 1903.

UNITED STATES PATENT OFFICE.

ARTHUR ROBINSON WEBSTER, OF MILFORD, NEW HAMPSHIRE.

ADJUSTABLE SOLDERING-BLOCK.

SPECIFICATION forming part of Letters Patent No. 746,422, dated December 8, 1903.

Application filed April 30, 1903. Serial No. 154,962. (No model.)

*To all whom it may concern:*

Be it known that I, ARTHUR ROBINSON WEBSTER, a citizen of the United States, and a resident of Milford, in the county of Hillsboro and State of New Hampshire, have invented a new and Improved Adjustable Soldering-Block, of which the following is a full, clear, and exact description.

This invention relates to blocks or the like employed for supporting small articles that require soldering to join parts together, and has for its object to provide novel details of construction for a device of the character indicated which afford a very convenient soldering-block that embodies readily-adjustable clamping means for the support of separated portions of eyeglass or spectacle frames which are to be soldered for their connection, the improvement being also available for reliably supporting separated portions of articles of jewelry that are to be united with solder.

The invention consists in the novel construction and combination of parts as is hereinafter described, and defined in the appended claims.

Reference is to be had to the accompanying drawings, forming a part of this specification, in which similar characters of reference indicate corresponding parts in all the figures.

Figure 1 is a perspective view showing the improvement arranged for holding two portions of a broken spectacle-frame in position for soldering together these portions where broken apart. Fig. 2 is a perspective view of the improved adjustable soldering-block arranged to hold the head and pin of an article of jewelry together for the application of solder thereto. Fig. 3 is a longitudinal sectional view taken substantially on the line 3 3 in Fig. 2, and Fig. 4 is a perspective view of jewelry-holders used in connection with the device shown in Figs. 1 and 2.

To adapt the portions of the supporting device for convenient adjustment into different positions, and thus afford a heat resisting bed whereon various differently-shaped articles of metal may be held securely in proper relative positions for rigid connection of their adjacent members by means of solder fluxed with flame and a blowpipe, the improved construction is particularly well adapted and embodies the following details:

Two preferably rectangular blocks 5, of asbestos board, are each slidably inserted endwise within similar supporting-frames, each frame consisting of two substantially U-shaped plates 6, each pair of clip-plates being spaced apart and held rigidly in parallel planes by a transversely-disposed tie-plate 7. The distance between each pair of clip-plates permits the bed-pieces 5 to be respectively inserted into the channels in a pair of the spaced clip-plates, and thus be adjustably held therein. The frames that afford support to the bed-pieces 5 are held alined edgewise and rockably connected together by the pair of link-bars 8, that are held oppositely on side edges of the clip-plates 6 by pivot-bolts 9. The link-plates 8 are preferably so disposed on the clip-plates that the inner ends of the latter will lie adjacent in pairs when the frames are adjusted to occupy the same plane, as shown in Fig. 1. It will also be seen that the linked connections provided between the supporting-frames will permit one frame to be arranged at any desired angle with regard to the other, so that the bed-pieces 5 may be disposed at a right angle to each other or be given any other degree of inclination that may be necessary for the proper support of an article that is to be held stationary, to permit the impinging portions thereof to be soldered together.

A perforation is formed in each bed-piece 5 at a suitable point for the reception of a threaded clamping-bolt 10, said bolts each having a flat head that seats in a countersunk depression in the bed-piece through which the bolt passes, this disposal of the bolt-heads permitting the supporting-frames that hold the bed-pieces 5 to seat properly on a level surface. On each bolt 10 a nut $10^a$ is screwed, and to facilitate a manual adjustment of said nuts they may be provided with wings, as indicated in the drawings. A clamping-bar 11 is furnished for each bolt 10, and said bars may be either straight, as shown, or be given any other form best adapted to engage with an object that is to be held upon the bed-pieces 5, each bar having a perforation through which a bolt 10 passes.

One of the uses for which the improved soldering-block is well adapted is to retain in position the broken frame of a pair of spectacles or eyeglasses, and, as shown in Fig. 1, to adapt the improvement for such service the bed-pieces 5 are rendered level by a proper adjustment of their supporting-frames.

In the use of the device the nuts $10^a$ are loosened from the bolts 10 and the broken parts A of the spectacle-frame are placed upon the bed-pieces 5, the rims A' of the frames from which the lenses have been removed being passed under the clamping-bars 11. The clamping-bars 11 are now disposed transversely upon the frame members, and the nuts $10^a$ are screwed upon the projecting ends of the bolts, so that the nuts have pressure on the clamping-bars. Now assuming that the broken portions A of the lens-frame have been placed on the bed-pieces 5, so that the fractured parts will have contact where they were broken before the clamping-bars 11 are compressed by the nuts $10^a$ upon the frame members A', it will be obvious that the fracture of the frame may be readily soldered in the usual manner as the spectacle-frame is seated upon the bed-pieces 5 and held from displacement until the nuts $10^a$ are unscrewed from the bolts 10. Furthermore, as the asbestos board is incombustible it does not burn away as does charcoal ordinarily employed to support small articles for repair by soldering, so that the fragmentary or granular soldering material that is placed upon the fractures will remain in contact therewith during the operation of heating the same to a melting-point.

It will be seen that the bed-pieces 5 if adjusted at an angle to each other will hold a pin B and its head B' in proper position for soldering, conveniently by means of a blowpipe and soldering material. As the blocks of asbestos board 5 may be moved apart, as well as rocked into any angular position, it will be apparent that an article of jewelry or the like of any form may be placed on the improved soldering-block and be held thereon so as to be soldered together at any desired point.

In Fig. 4 two bed-pieces $5^a$ are represented that may be substituted for the bed-pieces 5, and, as shown, these bed-pieces $5^a$ have notches $5^b$ in adjacent edges, which may be employed to receive and clasp together a fractured ring or any other article that cannot well be held with the clamping-bars 11 and bolts 10, the parallel side edges of the blocks $5^a$ having slidable and frictional engagement with the U-shaped portions 6 of each supporting-frame, so that when inserted therein in place of the pieces 5 they will effectively support any article placed between their notched edges.

Having thus described my invention, I claim as new and desire to secure by Letters Patent—

1. A soldering-block comprising two incombustible blocks, and means for holding said blocks free to slide toward and from each other.

2. A soldering-block, comprising two incombustible blocks, and means for holding said blocks adjustable at an angle to each other.

3. A soldering-block, comprising two incombustible blocks having parallel side edges, a supporting-frame slidably engaging the side edges of the blocks, and means for holding the frame adjustably.

4. A soldering-block, comprising two incombustible blocks having parallel side edges, frames for said blocks loosely holding their side edges, and link-bars pivoted at their ends oppositely on the frame.

5. A soldering-block, comprising two incombustible blocks parallel on their side edges, a frame for each block embracing its side edges, means for holding the frames rockably connected with each other, and a clamping device on the blocks.

6. A soldering-block, comprising two incombustible blocks parallel on their side edges, a frame for each block having channels in its side edges that receive the side edges of the blocks, a clamping device on each block, and means for holding the frames rockably connected with each other.

7. A soldering-block, comprising two incombustible blocks parallel on their side edges, said blocks having notches in their opposed ends, a frame holding each block, and link-bars pivoted oppositely on the side edges of the frames.

8. A soldering-block, comprising two rectangular flat blocks of incombustible material, a frame for each block, adapted to slidably engage the side edges thereof, two link-bars pivoted oppositely upon the side edges of the frames, and an adjustable clamping-bar on each block.

9. In a soldering-block of the character described, the combination with a two-part incombustible support for articles to be held for soldering, of a clamping device for each part of the support, comprising a bolt projecting from the incombustible support, a winged nut thereon, and a clamping-bar adapted for engagement with the bolt and nut.

In testimony whereof I have signed my name to this specification in the presence of two subscribing witnesses.

ARTHUR ROBINSON WEBSTER.

Witnesses:
JOHN A. BRUCE,
S. CARROLL COBURN.